US008839131B2

(12) United States Patent
Wallace et al.

(10) Patent No.: US 8,839,131 B2
(45) Date of Patent: Sep. 16, 2014

(54) TRACKING DEVICE MOVEMENT AND CAPTURED IMAGES

(75) Inventors: Alexander David Wallace, Sunnyvale, CA (US); Nikhil Bhatt, Cupertino, CA (US); Tim Cherna, San Francisco, CA (US); Eric Hanson, Emeryville, CA (US); Mark Lee Kawano, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 723 days.

(21) Appl. No.: 12/619,368

(22) Filed: Nov. 16, 2009

(65) Prior Publication Data

US 2011/0055749 A1  Mar. 3, 2011

Related U.S. Application Data

(60) Provisional application No. 61/237,193, filed on Aug. 26, 2009.

(51) Int. Cl.
*G06F 3/048* (2013.01)
*G06F 3/00* (2006.01)
*G06F 17/30* (2006.01)

(52) U.S. Cl.
CPC ...... *G06F 17/30265* (2013.01); *G06F 17/3087* (2013.01); *G06F 17/30997* (2013.01)
USPC ............................ 715/771; 715/738; 715/853

(58) Field of Classification Search
USPC ......................................................... 715/772
See application file for complete search history.

(56) References Cited

U.S. PATENT DOCUMENTS

| | | | |
|---|---|---|---|
| 6,278,446 B1* | 8/2001 | Liou et al. | 715/700 |
| 6,523,024 B1* | 2/2003 | Yajima et al. | 1/1 |
| 6,950,989 B2* | 9/2005 | Rosenzweig et al. | 715/721 |
| 7,149,961 B2* | 12/2006 | Harville et al. | 715/202 |
| 7,945,852 B1* | 5/2011 | Pilskalns | 715/230 |
| 2004/0070602 A1* | 4/2004 | Kobuya et al. | 345/738 |
| 2004/0145602 A1* | 7/2004 | Sun et al. | 345/720 |
| 2008/0077597 A1* | 3/2008 | Butler | 707/10 |
| 2008/0098316 A1* | 4/2008 | Declan | 715/764 |
| 2008/0162556 A1* | 7/2008 | McConnell | 707/104.1 |
| 2008/0282156 A1* | 11/2008 | Skicewicz et al. | 715/273 |
| 2009/0076719 A1* | 3/2009 | Geise et al. | 701/200 |
| 2009/0119583 A1* | 5/2009 | Kihara et al. | 715/273 |
| 2009/0319904 A1* | 12/2009 | Rensin et al. | 715/733 |
| 2010/0058212 A1* | 3/2010 | Belitz et al. | 715/766 |
| 2010/0113069 A1* | 5/2010 | Mindrum et al. | 455/456.3 |
| 2010/0158315 A1* | 6/2010 | Martin | 382/103 |
| 2010/0235366 A1* | 9/2010 | Andrew et al. | 707/752 |

* cited by examiner

*Primary Examiner* — Stephen Alvesteffer
(74) *Attorney, Agent, or Firm* — Wong, Cabello, Lutsch, Rutherford & Brucculeri LLP

(57) ABSTRACT

A computing device includes a memory configured to store position data and images. The computing device also includes a processor configured to execute instructions to perform a method that includes receiving position data that represents the positions of a position tracking device over a period of time. The position data includes a group of position coordinates that represent a location. The method also includes receiving images that include a group of images associated with the location. The method also includes aligning the group of position coordinates that represent the location and the group of images associated with the location. The method also includes presenting a representation of the alignment of the group of position coordinates and the group of images.

22 Claims, 8 Drawing Sheets

TRACKING DEVICE MOVEMENT AND CAPTURED IMAGES

CLAIM OF PRIORITY

This application claims priority under 35 USC §119(e) to U.S. Provisional Patent Application Ser. No. 61/237,193, filed on Aug. 26, 2009, the entire contents of which are hereby incorporated by reference.

BACKGROUND

This disclosure relates to a system for aligning tracks of position data and captured images.

In the ever expanding fields of personal computing and electronic devices, more and more features and functionality are being incorporated into portable devices. For example, cellular telephones may include cameras (for gathering images and video) and high resolution displays (for presenting various types of imagery and graphics) while still providing telecommunication functions (e.g., for placing and receiving telephone calls). Due to their robust processing and computational resources, such devices may provide various functions for professional and recreational applications. As such, numerous types of portable devices are capable of collecting data that may be processed, presented and stored.

SUMMARY

Disclosed herein are systems and methods for aligning images and data that represents the movement of portable computing devices. By associating such sets of data, a graphical display can be presented that represents the movement of a user along with images of scenery experienced by the user along the tracked path. Further, by adjusting the graphical display, the user may produce a presentation that best represents that path taken by the user and the most memorable images experienced for storage and later retrieval.

In some implementations, a computing device includes a memory configured to store position data and images. The computing device also includes a processor configured to execute instructions to perform a method that includes receiving position data that represents the positions of a position tracking device over a period of time. The position data includes a group of position coordinates that represent a location. The method also includes receiving images that include a group of images associated with the location. The method also includes aligning the group of position coordinates that represent the location and the group of images associated with the location. The method also includes presenting a representation of the alignment of the group of position coordinates and the group of images.

In other implementations, a method includes receiving position data that represents the positions of a computing device over a period of time. The position data includes a group of position coordinates that represent a location. The method also includes receiving images that include a group of images associated with the location. The method includes aligning the group of position coordinates that represent the location and the group of images associated with the location. The method also includes presenting a representation of the alignment of the group of position coordinates and the group of images.

In other implementations, one or more computer readable media store instructions that are executable by a processing device, and upon such execution cause the processing device to perform operations that include receiving position data that represents the positions of a computing device over a period of time. The position data includes a group of position coordinates that represent a location. The operations also include receiving images that include a group of images associated with the location. The operations include aligning the group of position coordinates that represent the location and the group of images associated with the location. The operations also include presenting a representation of the alignment of the group of position coordinates and the group of images.

These and other aspects and features and various combinations of them may be expressed as methods, apparatus, systems, means for performing functions, program products, and in other ways.

Other features and advantages will be apparent from the description.

DESCRIPTION OF DRAWINGS

Like reference symbols in the various drawings indicate like elements.

DETAILED DESCRIPTION

Figure 1:
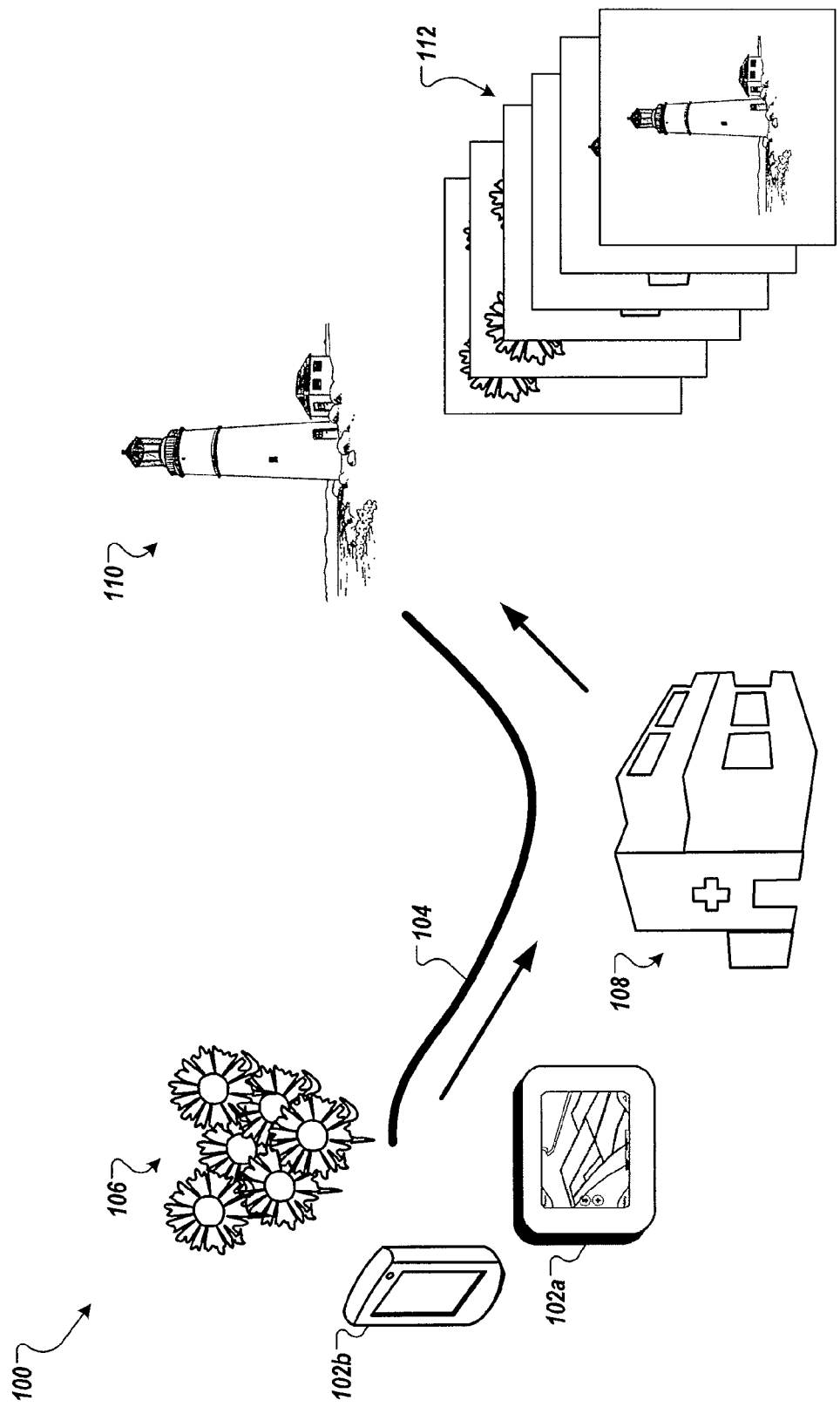
FIG. 1 illustrates a path tracked by mobile computing devices.

Referring to FIG. 1, an illustration 100 shows a series of exemplary scenes that may be experienced by an individual while traveling along a path. By carrying a portable computing device such as a position tracking device (e.g., a global positioning system (GPS) tracking device), or other similar device, data may be collected and used to track the path followed by the individual. For example, the position tracking device may use GPS technology or other types of wireless position finding technology (e.g., wireless fidelity (Wi-Fi)) to track the movement of the individual. In one arrangement, a position tracking device 102a includes computational resources (e.g., processor, memory, etc.) for processing and storing coordinates (e.g., latitude and longitude coordinates) that represent that global position of such a portable mobile device. As such, data is collected and preserved on the portable mobile device that represents a path 104 traveled by the individual holding the device.

While progressing along path 104, the individual may also carry other types portable devices capable of collecting various types of data. For example, a media capturing device 102b may be carried for collecting images. Such a device may take various forms, for example, along with providing telecommunication capabilities, a cellular telephone may be carried for collecting images by using a camera incorporated into the cell phone. Similarly, various types of cameras (e.g., a point and shoot digital camera, a DSLR, etc.) may be used as a media capturing device. While this example describes individual images (e.g., photographs) being collected with media capturing device 102b, other types of imagery (e.g., video) may also be collected with media capturing device 102b. For illustration, while progressing along path 104, the individual passes through a park (represented by flowers 106) that may provide various rural scenes of the local nature. Stopping along the way, images of the flowers 106 may be collected using the camera functionality of media capturing device 102b. Along with collecting the images, additional information may be collected. For example, many portable computing devices like media capturing device 102b include an internal clock that provides the time at each instance an image is captured. As such, data representing the time (e.g., month, day, hour, minute, second) that the image is captured is also collected and grouped with the image data. Similarly, timing information may also be collected by position tracking device 102a. Other types of collected data may include parameters associated with the media capturing device and the position tracking device (e.g., serial and model number), collection parameters (e.g., image resolution) and other similar information.

As the individual continues to travel (and carry media capturing device 102b) and capture additional images, position data is collected (with position tracking device 102a). For example, at approximately the midpoint of the traveled path 104, the individual may pass through an urban area (e.g., represented by a hospital 108). Similarly, the individual may pause and capture one or more images of these surroundings. Continuing on, and while continuing to collect position data (with position tracking device 102a), the individual may conclude the trip by stopping at a seaside location 110 (in this particular example). Similar the other locations experienced, images may be captured of the seaside along with related information (e.g., day and time when image capture occurred).

At the conclusion of the travel, significant amounts of information may be stored in media capturing device 102b and position tracking device 102a. For example, along with captured images 112 (and the corresponding day and time stamps) stored in memory on board media capturing device 102b, the position information collected from the position tracking device 102a may also be stored. As such, information may reside on media capturing device 102b and position tracking device 102a that represents path 104 traveled by the individual and sights experienced along the path. Often to review the events of a trip, an individual may cycle through the captured images and possibly adjust the sequence of the images to correlate with particular time instances of the trip. However, by capturing a significant number of images and traveling in a somewhat meandering manner, the correlation between the path traveled and the captured images can become confused. As such, along with possibly being unable to recall the sequence that the images were captured, an individual may be unable to recall the path traveled. For situations in which the individual would like to explain (to another) the path traveled or may need to retrace the path, e.g., for returning to the starting point, the collected images may be of little or no help. However, by associating the collected position data and the captured images, an individual can correlate various locations along the path traveled. Further, by incorporating the position data and the captured images into a graphical map, the individual can visually track the area traveled and the locations visited. In this particular example, the position data and the images are collected by two separate devices (e.g., position tracking device 102a, media capturing device 102b). However, in some arrangements this functionality may be shared by a single devices. For example, one device carried by the individual may collect position data and images.

Figure 2:
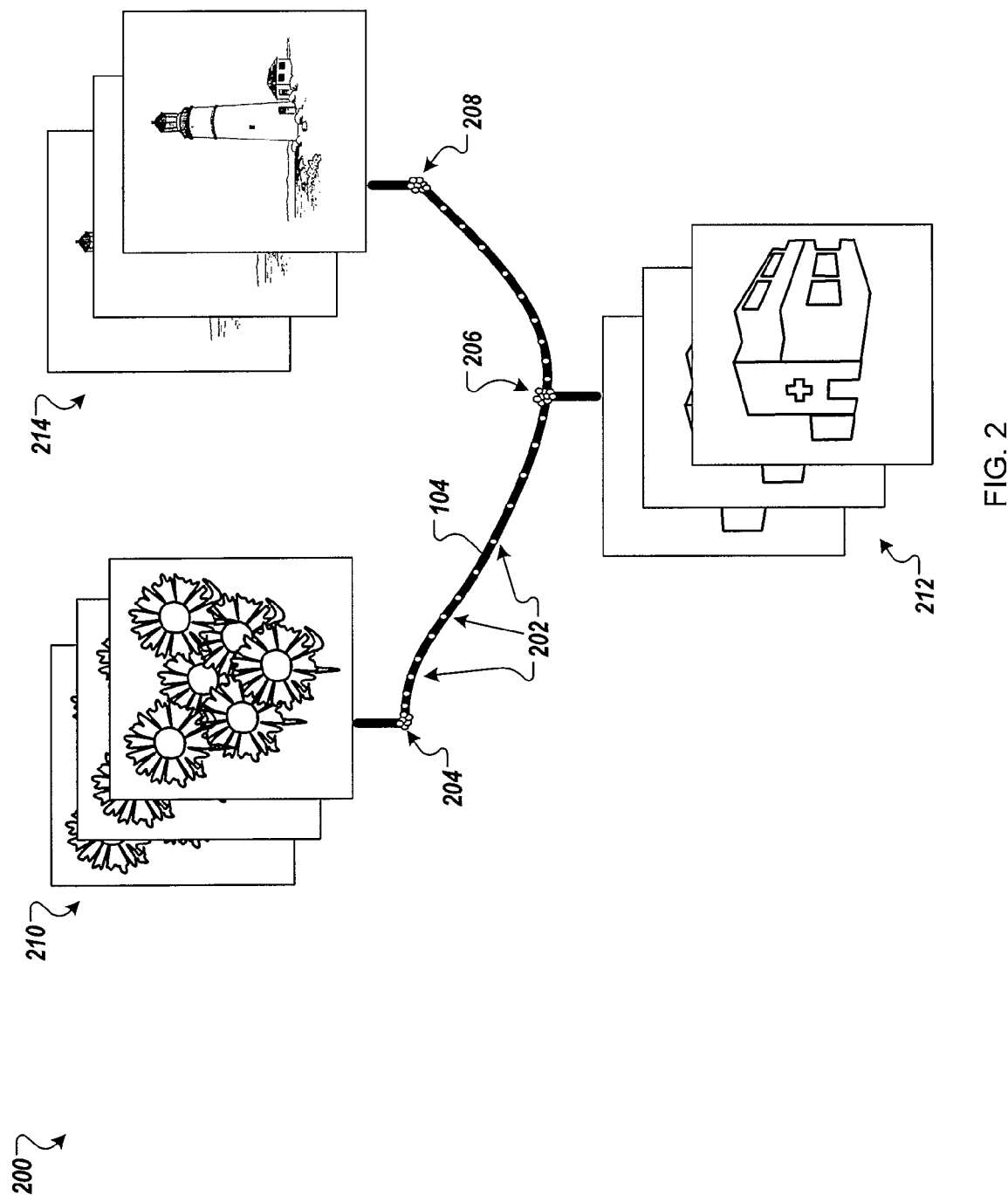
FIG. 2 illustrates images associated with a tracked path.

Referring to FIG. 2, a graphical representation 200 illustrates the combining of position data (e.g., GPS position coordinates) and captured images. In this particular example, the position data is represented by a series of data points 202 that correspondingly traverse along path 104. As often occurs, an individual pauses while taking photographs at locations of interest. However, while pausing, position data typically continues to be collected. For example, a GPS receiver may collect coordinate data at predefined intervals (e.g., every 30 seconds). As such, position data may appear to group around the location where the individual pauses. In this particular example, three groups of position data 204, 206, 208 respectively correspond to three locations where the individual paused to capture images with media capturing device 102b. Multiple images (e.g., images 210, 212, 214) are represented as being captured at each of the three locations. By associating the respective groups of captured images with the appropriate position data groupings, the path traveled by the individual may be represented along with imagery experienced by the user. As such, graphical representation 200 may allow the individual to recall the particular path 104 traveled. Further, such information may be stored and used at a later time by the individual or others. For example, by viewing the traveled path and captured images, another individual can become familiar the general area and points of interest prior to visiting.

Figure 3:
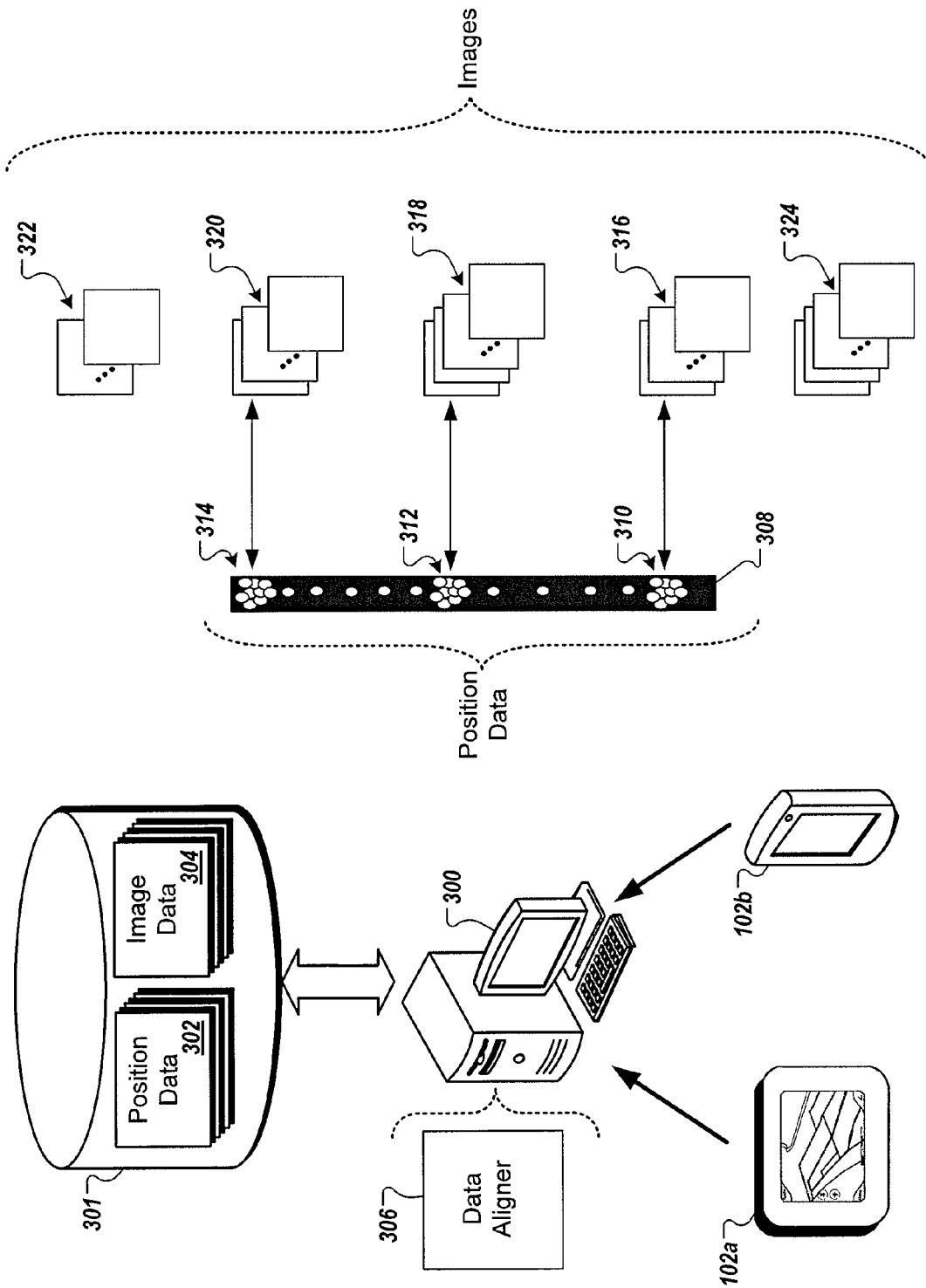
FIG. 3 illustrates a system for aligning position data and captured images.

Referring to FIG. 3, position tracking device 102a and media capturing device 102b are capable of providing (e.g., uploading, etc.) the collected data (e.g., position data, images) to a computing device such as a computer system 300 for processing, presenting and storage. For example, the data may be stored in memory 301 that uses one or more storage techniques (e.g., random access memory (RAM), static RAM (SRAM), dynamic RAM (DRAM), etc.). In some implementations, memory 300 may include one or more types of storage devices (e.g., a hard drive, CD-ROM, etc.) for storing the position and imagery data. While memory 300 is illustrated as storing both position data 302 and images 304, in some arrangements this content may be stored in a distributed manner by using multiple memories. Other computing devices may also be implemented for storing and processing the data. For example, either of the portable devices (e.g., position tracking device 102a, media capturing device 102b) may be capable of receiving data (from the other device) for storage, processing (e.g., alignment) and presentation.

To form an association between the position data and the captured images, computer system 300 executes data aligner 306. In general, data aligner 306 identifies one or more groups of position data that correspond to locations where the individual (carrying the media capturing device) may have paused to capture one or more images. Once identified, images are correspondingly aligned with the position data, and the alignment information may be stored (e.g., in memory 301). Computer system 300 may also provide a graphical representation of the aligned position data and positions of the images, thereby allowing the user to review the track of the path followed and the images collected while traveling the path. Such graphical representations may also be produced by computer system 300 or another computing device from the data stored in memory 301. Also, while media capturing device 102b is used in this example for image capture, in some arrangements, other devices (e.g., a camera) is used for collecting images.

One or more methods and techniques may be implemented to align position data and captured images. For one exemplary alignment technique, date and time information associated with position data may be aligned to similar date and time data associated with the captured images. Typically, both the position data and the images are collected in a substantially linear sequence. As such, aligning one group of position data with a captured image (or a group of images) captured at one location may correspondingly cause other images and position data (associated with other locations of captured image) to be aligned. As such, aligning one position data/image pair may allow most (if not all) of the other captured images to be aligned with corresponding position data. In some arrangements, one or more offsets may be applied to assist with alignment. For example, a time offset (e.g., 1 hour) may be applied to one set of time data to account for time differences due to one or more time zones or other synchronization issues.

In this particular arrangement, to form the alignment, the position data is divided into a series of segments that represent position changes over a predefined period of time. For example, the position data (which may be stored in a single file) may be divided into a series of two-hour segments. By producing such segments for relative short and finite periods of time, the probability increases that each segment may be relatively straight (and does not overlap). Various time period may be defined for producing the segments, for example, segment 308 may represent two hours of position data. However, shorter or extended time periods may be used for segment production.

As illustrated in the figure, segment 308 contains data points that represent the GPS coordinates that track the movements of position tracking device 102a (or another device) during the two hour period. Within segment 308, three groups of position data 310, 312, 314 represent three respective instances that the individual carrying position tracking device 102a may have paused (e.g., to capture some images with media capturing device 102b). As such, one or more captured images may be associated with each of the groups of position data. To determine such associations, data aligner 306 may compare date and time data associated with the position data with similar date and time data associated with the captured images. For example, the data and time information associated with position data group 310 may correspond to time and date stamps of a group of captured images 316. Similarly, data aligner 306 may determine that date and time information associated with position data groups 312 and 314 correspondingly align with the data and times of captured image groups 318 and 320. Typically if one or more images are not found to align with position data, the images may not be assigned to position data. However, the images may be found to align with other segments. For example, while data aligner 306 may not identify position data within segment 308 that corresponds to any images of captured image groups 322 and 324, other segments of position data may be identified for alignment.

Along with not assigning one or more images to a segment, data aligner 306 may perform other operations associated with alignment. For example, upon aligning one or more images (e.g., image group 318) with position data (e.g., position data group 312), alignments may be adjusted (e.g., based upon user input). In one situation user input may manually identify one or more images (e.g., image group 318) and the position data (e.g., position data group 314) to which the images should be associated. As such, the image and position data alignments may be rearranged by a user. Based upon such manual adjustments and input, data aligner 306 may rearrange the image and data position assignments. For example, after a user directed assignment of an image and data position pair, data aligner 306 may accordingly shift other assignments (e.g., assign image group 316 to position data group 312, and, assign image group 324 to position data group 310). Assignments may be shifted in various directions by data aligner 306 based upon the user input or other types of trigger events. Other operations of data aligner 306 may also include combining image groups or separating one or more images from an image group.

Figure 4:
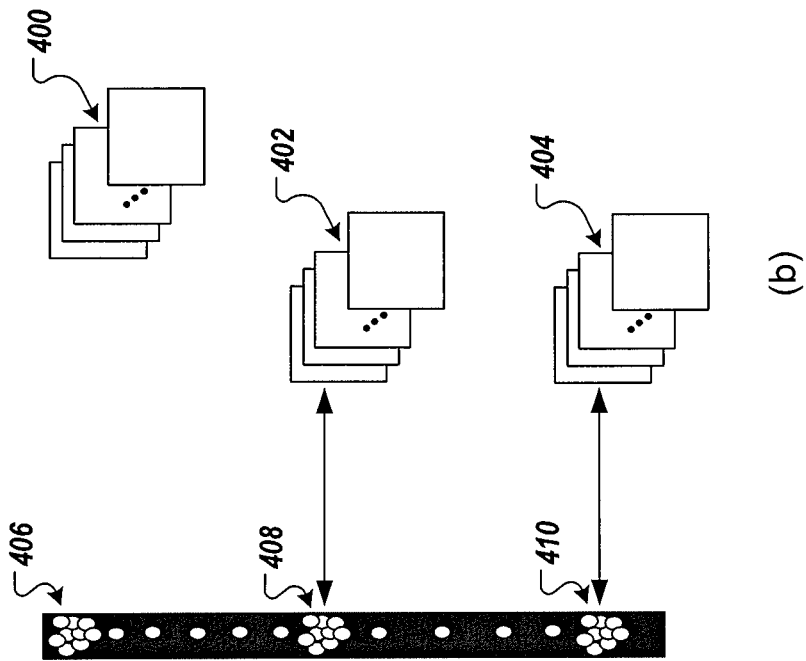
FIGS. 4(a) and (b) illustrate adjusting alignments between position data and captured images.
Figure 4:
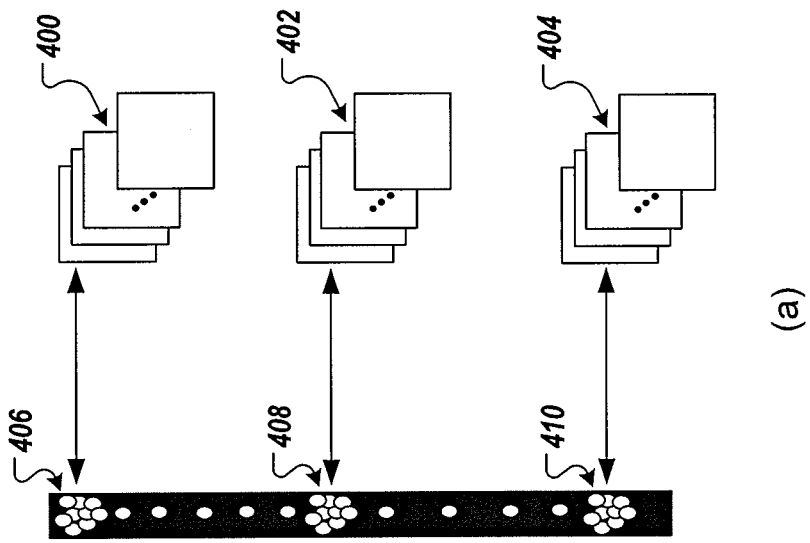

Referring to FIG. 4(a), alignment operations provided by data aligner 306 may include removing one or more assignments between position data and images. For example, based upon date and times associated with position data and captured images, data aligner 306 may respectively assign image groups 400, 402 and 404 to position data groups 406, 408 and 410. Upon presenting the alignment of the images and position data, a user may identify that one or more images are incorrectly assigned to a location. For example, image group 400 (e.g., pictures of an urban scene) may not correspond to position data group 406 (e.g., GPS position coordinates of a seaside location). As such, a user may direct data aligner 306 is remove the association between image group 400 and position data group 406, as illustrated in FIG. 4(b). Upon being removed, image group 400 may be associated with another position data group (e.g., to indicate the capture location of the images). Such alignment adjustments may be initiated by data aligner 306 or based upon user interaction (e.g., with media capturing device 102b). In some arrangements, the alignment of other images and position data is unaffected by the removal of an image/position data association. For example, while the association between image group 400 and position data group 406 may be removed, the other associations (e.g., image group 402 and position data group 408, and, image group 404 and position data group 410) may remain in the alignment. Similarly, in some arrangements one or more image and position data associated may be added to an alignment such that previous associations among other images and position data is unaffected.

Figure 5:
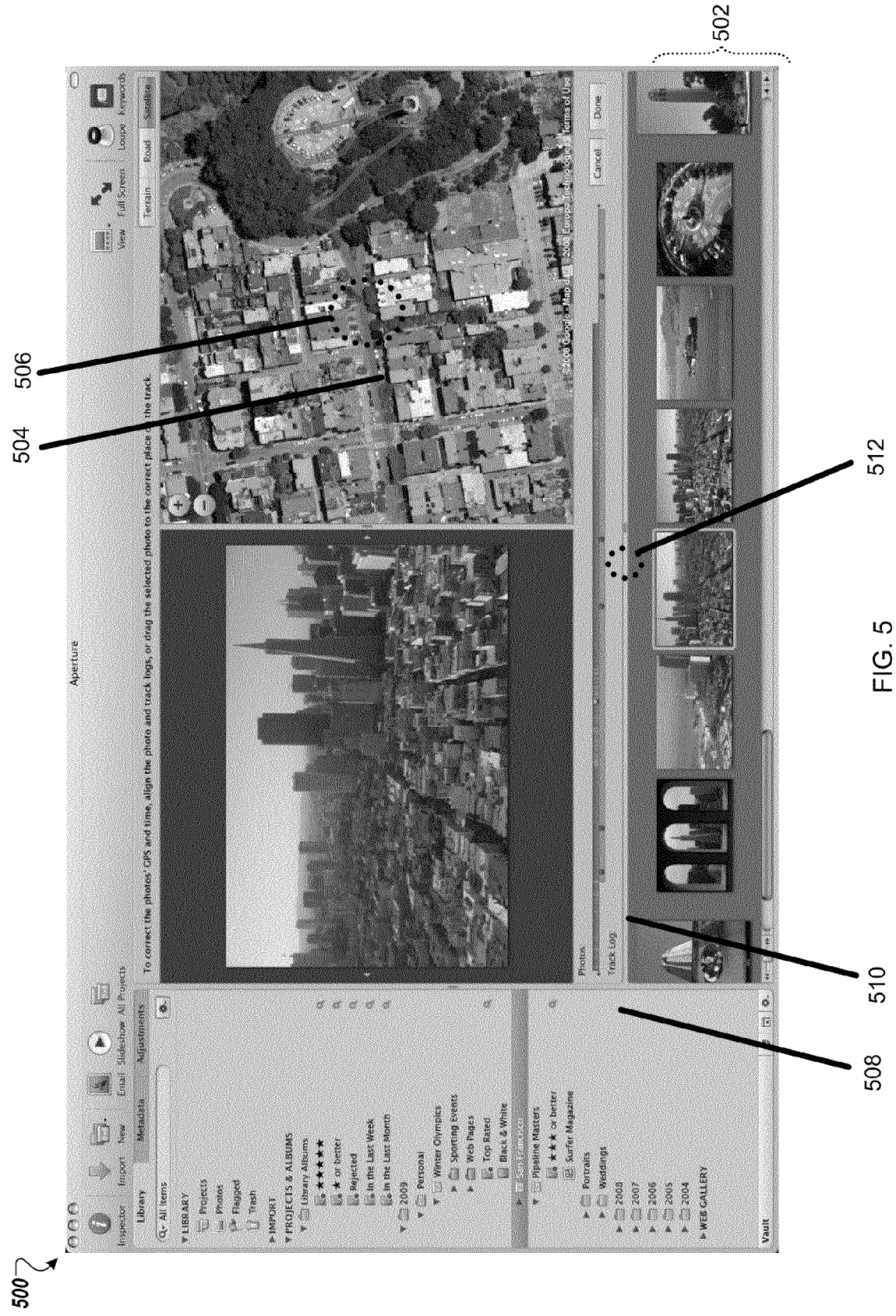
FIG. 5 illustrates a graphical user interface.

Referring to FIG. 5, an exemplary user interface 500 illustrates an alignment among images and position data. In this arrangement, a series of images 502 are presented in user interface 500 along with a graphical representation 504 of the position data that tracks an individual traveling through an urban area. To assist the viewer and to provide context, the graphical representation 504 overlays a map of the urban area. To indicate an association between a position data group and an image, a graphical pin 506 is illustrated along the graphical representation 504 that represents the location where the image was captured. By adjusting the location of graphical pin 506, the image/position data association may be adjusted, for example, removing graphical pin 506 may remove association from the alignment of images and the position data. Similarly, an image may be selected from the series of images 502 and placed (e.g., dragged) to a particular location on the graphical representation 504 of the position data to form an association. Adjustments may also be initiated by shifting a graphical bar 508 that represents the sequence of the images (and the corresponding times that the images were captured). Adjustments may also be initiated by shifting a graphical bar 510 that represents the collected position data, or by shifting both graphical bars 508 and 510. In this arrangement, graphical bar 510, which represents the position data, includes data points 512 that represent groups of position data that indicate possible pauses in movement of the tracked individual. Other types of graphical representations may also be incorporated into user interface 500 for illustrating information associated with the position data and associated images. For example, color and color level changes may be used to represent the velocity and/or direction of the individual being tracked from the position data. Additionally, changes in color (and other graphical effects may be used to contrast portions of a map (to which position data is overlaid). For example, as the position data transitions from an urban area to a rural or seaside area, colors used to represent the position data may be changed.

Figure 6:
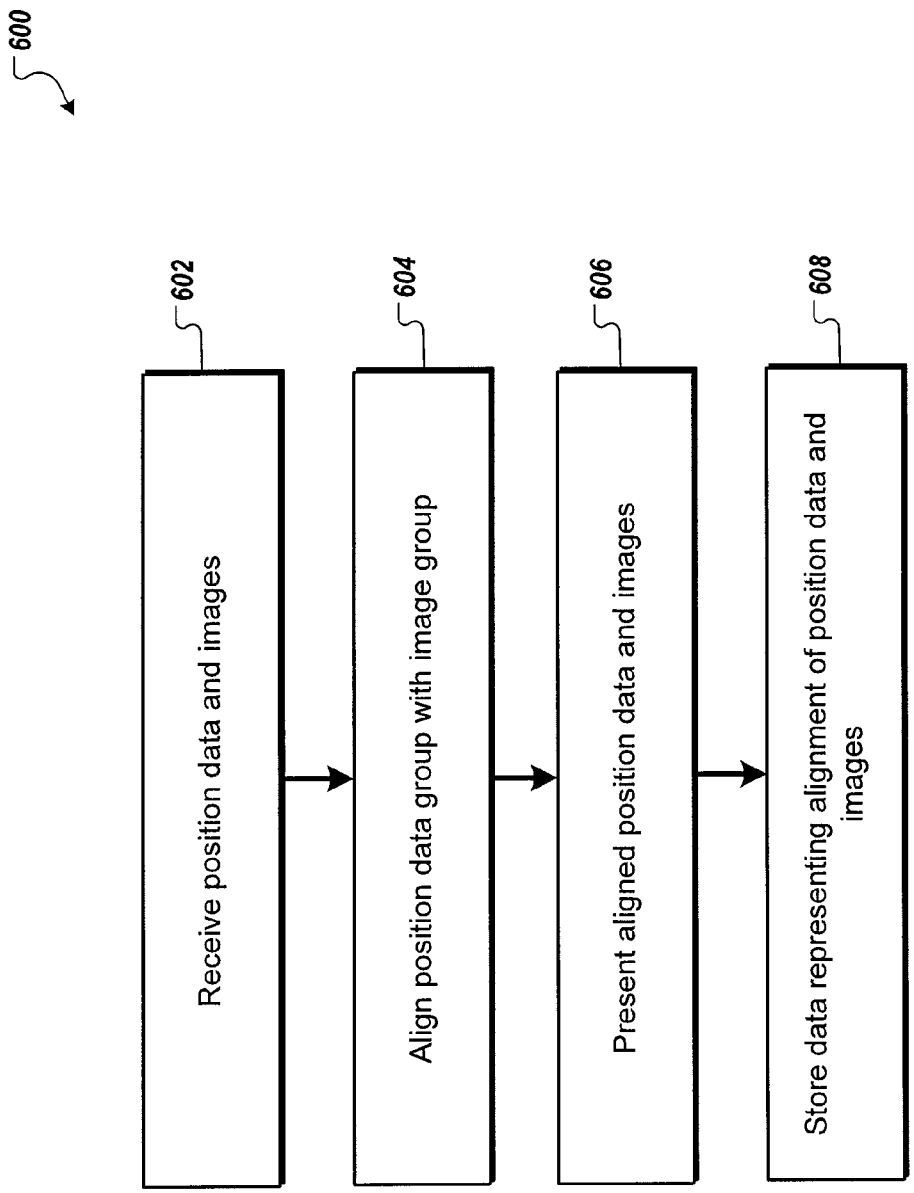
FIGS. 6 and 7 are flow charts that represent operations of a data aligner.

Referring to FIG. 6, a flowchart 600 represents some of the operations of data aligner 306 (shown in FIG. 3). The operations may be executed by a single computing device (e.g., computer system 300) or multiple computing devices. Along with being executed at a single site (e.g., one computing device), operation execution may be distributed among two or more sites.

Operations include receiving 602 position data and images. The position data represents the positions of a computing device over a period of time. The position data also includes one or more groups of position coordinates that represent one or more corresponding locations. The received images include at least one group of images associated with one of the locations (e.g., capture locations) represented in the position data. Operations of data aligner 306 also include aligning 604 one position data group and one image group, however, data aligner 306 may align multiple groups of position data with corresponding groups of images. For example, data aligner 306 may compare time data associated with the position data (e.g., as provide from GPS data) to time data that represents when each image was captured. Upon establishing the alignment between the position data group and the image group, data aligner 306 may initiate the presenting 606 the aligned position data and the images. Once the information has been aligned, other operations may be provided by data aligner 306. For example, operations may include storing 608 data that represents the alignment of the position data and the images.

Figure 7:
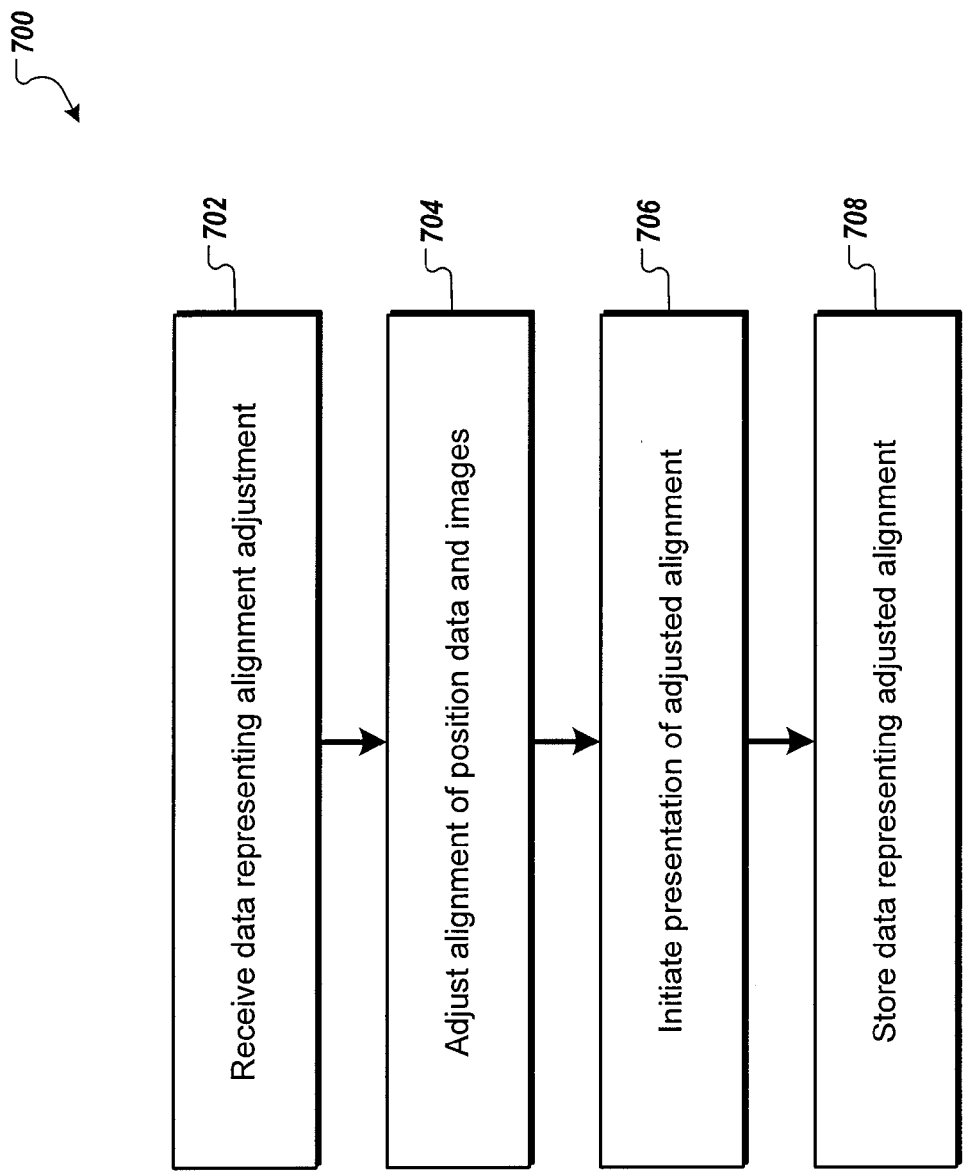

Referring to FIG. 7, a flowchart 700 represents additional operations of data aligner 306 (shown in FIG. 3). Along with establishing alignments between position data and images, data aligner 306 may execute operations to adjust alignments. As such, operations may include receiving 702 data that represents one or more alignment adjustments. For example, a user may provide data (e.g., by interacting with computer system 300) that represents one or more adjustments. A user may select to change the alignment of position data and images, for example, images may be selected for removal, to be re-assigned to other position data (e.g., position coordinates of another location), etc. Based upon the received data representing the alignment adjustment, operations may include adjusting 704 the alignment of the position data and the images. Similar to the operations described in flowchart 600, operations of data aligner 306 may include initiating 706 presentation of the adjusted alignment and storing 708 data that represents the adjusted alignment (e.g., in memory 301).

Figure 8:
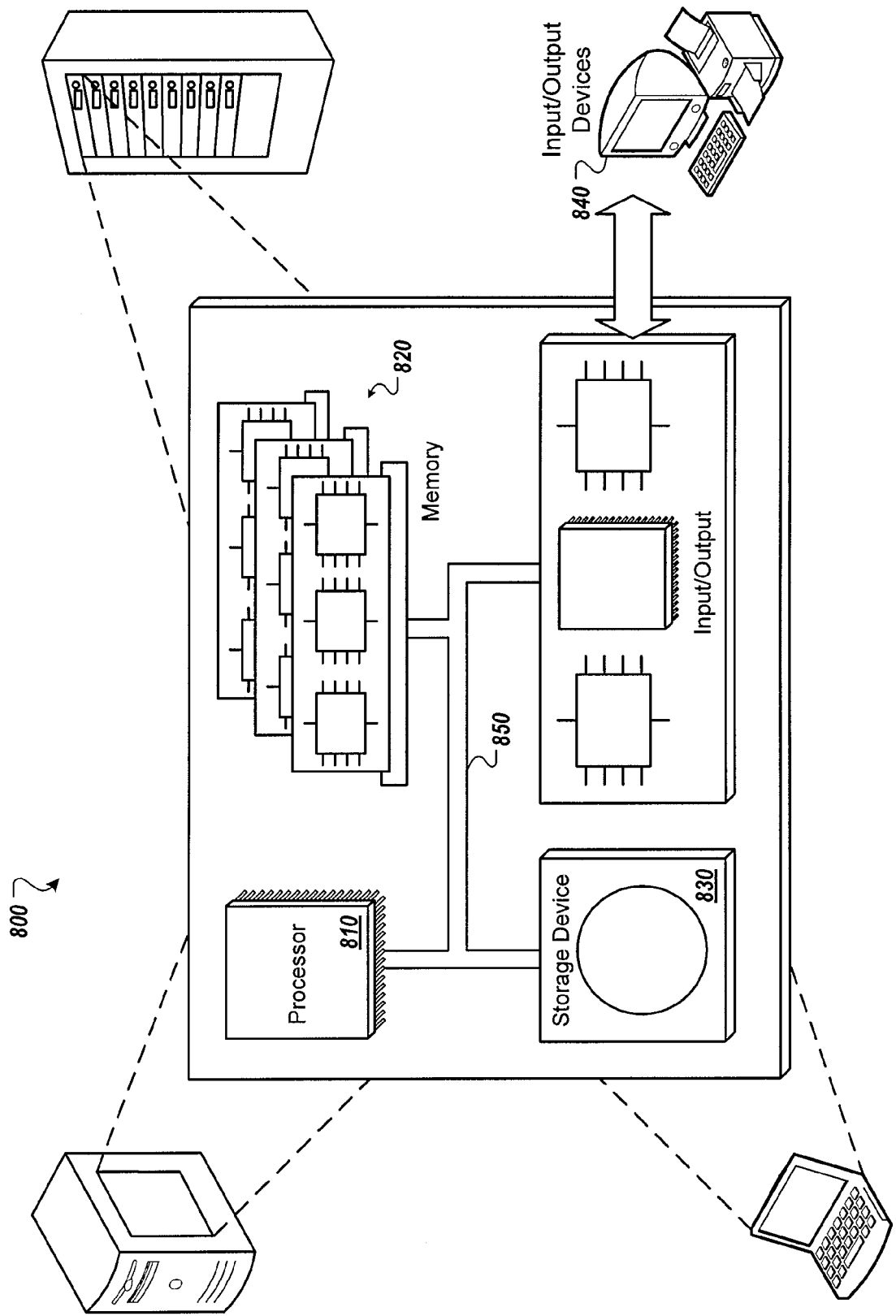
FIG. 8 represents a computer system and related components.

Referring to FIG. 8, a schematic diagram of a generic computer system 800 is illustrated. The system 800 can be used for the operations described in association with any of the computer-implemented methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims. For example, the techniques described herein can be performed in a different order and still achieve desirable results.

The invention claimed is:

1. A computing device comprising:
a memory configured to store position data and images;
a display unit operatively coupled to the memory; and
a processor configured to execute instructions stored in the memory to perform a method comprising:
receiving a plurality of position data points that represent positions of a position tracking device over a period of time, wherein each of the plurality of position data points include corresponding first time information;
identifying one or more position data point clusters based, at least in part, on the corresponding first time information, wherein the one or more position data point clusters represent one or more locations at which the position tracking device was substantially stationary during a portion of the period of time;
receiving a plurality of images captured during the period of time, wherein each of the images includes corresponding second time information;
displaying, on the display unit, a first adjustable control that includes a depiction of a sequential arrangement of at least some of the images;
displaying, on the display unit, a second adjustable control that includes a depiction of a sequential arrangement of at least some of the one or more locations at which the position tracking device was substantially stationary;
receiving an indication of a manual alignment of the first adjustable control and a manual arrangement of the second adjustable control; and
aligning, in response to receiving the indication, at least one first image from the sequential arrangement of images with at least one first location from the sequential arrangement of locations by associating the at least one image's second time information with the at least one location's first time information.

2. The computing device of claim 1, wherein the method further comprises, in response to aligning the at least one first image with the at least one first location, aligning additional locations with additional images based, at least in part, upon alignment of the at least one first location with the at least one first image.

3. The computing device of claim 2, wherein the instructions to configure the processor for aligning the additional locations having additional first time information with the additional images having additional second time information comprise instructions to configure the processor for:
identifying a time offset between the time information corresponding to the at least one location's first time information and the at least one image's second time information; and
utilizing the time offset to align the additional locations with the additional images.

4. The computing device of claim 1, wherein the method further comprises storing data that represents the alignment of the at least one location and the at least one image in the memory.

5. The computing device of claim 1, wherein the method further comprises displaying the alignment on the display unit.

6. The computing device of claim 1, wherein the instructions to configure the processor for aligning the at least one first location and the at least one first image comprise instructions to configure the processor for comparing the first time information associated with the at least one first location and the second time information associated with the at least one first image.

7. The computing device of claim 6, wherein the method further comprises applying an offset to the first time information associated with the at least one image.

8. The computing device of claim 7, wherein the offset represents a time difference between at least two time zones.

9. The computing device of claim 1, wherein the instructions to configure the processor for receiving the position data points comprise instructions to configure the processor for receiving the position data points from a first device and the instructions to configure the processor for receiving the images comprise instructions to configure the processor for receiving the images from a second device.

10. A method to align position data and image data, comprising:
receiving a plurality of position data points that represent the positions of a computing device over a period of time, wherein each of the plurality of position data points include corresponding first time information;
identifying one or more position data point clusters based, at least in part, on the corresponding first time information, wherein the one or more position data point clusters represent one or more locations at which the computing device was substantially stationary during a portion of the period of time;
receiving a plurality of images captured during the period of time that include, wherein each of the images include corresponding to second time information;
displaying a first adjustable control that includes a depiction of a sequential arrangement of at least some of the images;
displaying a second adjustable control that includes a depiction of a sequential arrangement of at least some of the one or more locations;
receiving an indication of a manual alignment of the first adjustable control and a manual arrangement of the second adjustable control;
aligning, in response to receiving the indication, at least one first image from the sequential arrangement of images with at least one first location from the sequential arrangement of locations by associating the at least one image's second time information with the at least one location's first time information; and displaying, on a display unit, a representation of the alignment of the at least one first location with the at least one first image.

11. The method of claim 10, further comprising aligning additional locations with additional images based, at least in part, upon the alignment of the at least one first location with the at least one first image.

12. The method of claim 11, wherein aligning the additional locations with the images comprises:
identifying a time offset between the time information corresponding to the at least one location's first time information and the at least one image's second time information; and
utilizing the time offset to align the additional locations and the additional images.

13. The method of claim 10 further comprising storing data that represents the alignment of the at least one location and the at least one image in a memory.

14. The method of claim 10, wherein aligning the at least one first location and the at least one first image comprises comparing first time information associated with the at least one first location and second time information associated with the at least one first image.

15. The method of claim 14, further comprising applying an offset to the first time information associated with the at least one image.

16. The method of claim 15, wherein the offset represents a time difference between at least two time zones.

17. The method of claim 10, wherein the position data points include GPS data points.

18. The method of claim 10, wherein receiving the position data points comprises receiving the position data points from a first device and receiving the images comprises receiving the images from a second device.

19. A non-transitory program storage device, readable by a processor and comprising instructions stored thereon to cause one or more processors to:
receive a plurality of position data points from a position tracking device, wherein each of the position data points includes corresponding first time information;
identify one or more groups of position data points from the received position data points, wherein each group of position data points represents a location at which the position tracking device was substantially stationary for a period of time;
receive a plurality of images, wherein each of the images includes corresponding second time information;
display a first adjustable control that includes a depiction of a sequential arrangement of at least some of the images;
display a second adjustable control that includes a depiction of a sequential arrangement of at least some of the locations;
receive an indication of a manual alignment of the first adjustable control and a manual arrangement of the second adjustable control; and
align, in response to the received indication, at least one image from the sequential arrangement of images with at least one location from the sequential arrangement of locations by associating the at least one image's second time information with the at least one location's first time information.

20. The non-transitory program storage device of claim 19, wherein the instructions to cause the one or more processors to identify one or more groups of position data points comprise instructions to cause the one or more processors to:
divide the position data points into time-based segments; and
identify, within one or more of the time-based segments, clusters of data points that correspond to a substantially similar position.

21. The non-transitory program storage device of claim 19, wherein the first and second adjustable controls comprise bars in a graphical user interface.

22. The non-transitory program storage device of claim 21, wherein the instructions to cause the one or more processors to associate one or more images with one or more of the locations by manually aligning the second time information with the first time information comprise instructions to cause the one or more processors to:
receive an input via the graphical user interface that associates a first location with a first image; and
automatically associate one or more additional locations with one or more additional images based on the association of the first location and the first image.

* * * * *

UNITED STATES PATENT AND TRADEMARK OFFICE
CERTIFICATE OF CORRECTION

PATENT NO. : 8,839,131 B2  
APPLICATION NO. : 12/619368  
DATED : September 16, 2014  
INVENTOR(S) : Alexander David Wallace et al.

Page 1 of 1

It is certified that error appears in the above-identified patent and that said Letters Patent is hereby corrected as shown below:

In the Claims  
Column 9, line 60 (Claim 1), insert the word --first-- before the word "image's".  
Column 9, line 61 (Claim 1), insert the word --first-- before the word "location's".  
Column 10, line 7 (Claim 3), insert the word --first-- before the word "location's".  
Column 10, line 8 (Claim 3), insert the word --first-- before the word "image's".  
Column 10, line 14 (Claim 4), insert the word --first-- before the word "location".  
Column 10, line 14 (Claim 4), insert the word --first-- before the word "image".  
Column 10, line 51 (Claim 10), delete the words "that include".  
Column 10, line 52 (Claim 10), delete the word "to".  
Column 10, line 66 (Claim 10), insert the word --first-- before the word "image's".  
Column 10, line 67 (Claim 10), insert the word --first-- before the word "location's".  
Column 11, line 9 (Claim 12), insert the word --additional-- before the word "images".  
Column 11, line 11 (Claim 12), insert the word --first-- before the word "location's".  
Column 11, line 12 (Claim 12), insert the word --first-- before the word "image's".  
Column 11, line 17 (Claim 13), insert the word --first-- before the word "location".  
Column 11, line 18 (Claim 13), insert the word --first-- before the word "image".  
Column 11, line 25 (Claim 15), insert the word --first-- before the word "image".

Signed and Sealed this  
Ninth Day of December, 2014

Michelle K. Lee  
*Deputy Director of the United States Patent and Trademark Office*